Patented Dec. 28, 1937

2,103,238

UNITED STATES PATENT OFFICE 2,103,238

SYNTHETIC RESIN MANUFACTURE

Herbert O. Albrecht, Ronald A. McGlone, and Stephen John Roskosky, Flint, Mich., assignors to E. I. du Pont de Nemours & Company, Wilmington, Del., a corporation of Delaware No Drawing. Application July 13, 1934, Serial No. 735,049

11 Claims. (Cl. 260—8)

This invention relates to polyhydric alcohol-polybasic acid resins, and more specifically to a method of producing resins of improved and desirable properties by special control and chemical action.

The usual resins of the type just mentioned, when modified with 50% or less of fatty oil, have the disadvantage of exhibiting rather high acid numbers when used in solution as varnishes. This high acid number means in practice that basic pigments, such as zinc oxide, are apt to cause livering of paints and enamels using the resin as a vehicle.

A previous method of obtaining varnish resins of the polyhydric alcohol-polybasic acid type having acid numbers comparable to those of natural resin varnishes, and containing not an unduly large proportion of oil modifier, has been to use further modifying agents such as mono-basic acids of low molecular weight in place of part of the phthalic acid, or mono-hydric and dihydric alcohols in place of some glycerine. Resins prepared in this way may have the undesirable properties of being too soft or too expensive and the modifying ingredients referred to are often more volatile than the phthalic anhydride and glycerine commonly used, with the result that such resins of low acid number require special closed apparatus for their manufacture.

Another method by which acid numbers can be reduced somewhat is by use of an excess of glycerine in polyhydric alcohol-polybasic acid resins. This results in softening the resin and increasing its sensitivity to water, while the acid number is only with difficulty reduced even by a considerable excess of glycerine, due to unfavorable position of the remaining carboxyl groups relative to the size and shape of the glycerine molecule.

A third method of reducing the acid number of these oil-modified resins is by the addition of various amino-compounds to the finished resin. This results often in increasing the viscosity of such resins in solution to an undesirable extent, or in slowing up the oxidation of the drying oil which may be a constituent of the resin, or in causing yellowing of enamel films in which the resin is used, or producing other undesirable effects in the complex paint mixture. In addition, suitable amino-compounds for the purpose are relatively expensive ingredients of the resin.

This invention has as an object the preparation of resins analogous to the usual modified and unmodified glycerine-phthalic acid resins but with acid numbers very considerably lower and in some cases approaching zero. A further object of this invention is to make resins of these characteristics without using ingredients any more expensive than phthalic anhydride, glycerine, and various fatty oils and oil acids. A still further object is the production of resins of the polyhydric alcohol-polybasic acid type by very rapid and cheap processes requiring only simple equipment.

These objects are accomplished by the following invention which consists in conducting the resin reaction, under the conditions hereinafter pointed out, in the presence of controlled amounts of copper in solution in the resin ingredients.

The present invention in its preferred embodiment may be carried out in a very simple manner. A small amount of copper in the form of almost any organic salt is added to the resin at a stage when both phthalic anhydride and alcoholic constituents are present. The exact moment of addition of the copper will depend on the method of making the particular resin in question, and in some cases, the copper may be added with all the other ingredients at the start. This will be understood by those skilled in the art, and it is to be further understood that the properties of the resin may also be controlled to some extent by the choice of time for adding the catalyst. This is especially true when modifiers such as wood oil, which change independently of the esterification reaction, are to be treated to a certain desired degree.

The reaction of the phthalic anhydride with the hydroxylic constituents is then carried out preferably at a temperature between 425–500° F., and, if desired, in open kettles by the simplest possible methods. Temperatures as low as 390° F. and as high as 540° F. sometimes, though not always, produce the desired result, but a definite effect of the copper is usually noticeable. The effect is increasingly apparent at temperatures up to 520° F. and even higher. Temperatures above 500° F. are, however, undesirable for a number of reasons, chief of which are the volatility of the ingredients at such temperatures and the likelihood of forming resins of undesirably low molecular weight.

The addition of from 0.002% to 1.0% of copper calculated as metal, based upon the total weight of the resin ingredients is in most instances sufficient to attain the objects of the invention. The preferred amount, upon the same basis, is within .01 to 0.3%. More than this maximum amount does not affect the operativeness of the process but amounts substantially in excess of 0.3% are unnecessary and affect materially the color of the finished resin.

The method of practising our invention is illustrated by the following examples:

Example I

Charge into a kettle of Monel metal the following:

| | |
|---|---|
| Chinawood oil | lbs 96 |
| Linseed oil | lbs 96 |
| Glycerine | lbs 40 |
| Caustic soda | oz 7 |

Heat, covered, at 480° F., six minutes with thorough stirring. The material should be homogeneous. Add:

| | |
|---|---|
| Phthalic anhydride | lbs 160.8 |
| Copper acetate | ozs 14 |

Heat to 450° F. Add:

| | |
|---|---|
| Glycerine | lbs 28 |

Hold at 460° F. with stirring about three hours to an acid number of 10. This proportion of ingredients ordinarily gives a resin of very high acid number (over 60).

Example II

Charge into a stainless steel kettle:

| | Pounds |
|---|---|
| Cocoanut oil | 4.00 |
| Glycerine | .80 |
| Caustic soda | .04 |

Heat at 470° F. until homogeneous. Add:

| | Pounds |
|---|---|
| Phthalic anhydride | 4.64 |
| Glycerine | 1.17 |

Bring to 425° F. and add

| | |
|---|---|
| Copper oleate | .09 |

Hold at 450° F., about two hours with stirring to an acid number of 2. A holding time up to six hours may be required without copper to attain a low acid number, depending on the amount of blowing with inert gas.

Example III

| | Pounds |
|---|---|
| Linseed oil acids | 33.6 |
| Glycerine | 24.7 |
| Phthalic anhydride | 50.3 |
| Copper acetate | .03 |

The ingredients are placed in a suitable metal container, made, for example, of aluminum, Monel metal, stainless steel, or even of iron if color is not an important factor. They are brought to a temperature of 480° F. and held there until the acid number is below 5. With stirring, the holding time should be less than two hours. During the course of the resin reaction the melt turns from green to colorless, then to brown, and finally at low acid number the copper is usually precipitated in the finely divided metallic state.

A resin with an acid number below 10 is generally satisfactory for use even with very reactive pigments. The resin of the example above, if made without copper, would tend to gel with an acid number of about 50 and might even give difficulties in making at all under practical conditions and at the given temperature.

Example IV

| | Grams |
|---|---|
| Phthalic anhydride | 70 |
| Glycerine | 16.5 |
| Diethylene glycol | 22.5 |
| Copper acetate | .22 |

Heat at 470° F. in glass or stainless steel about ½ hour to acid number of 5. Without copper, the resin will gel. If desired, .11 gram of sodium acetate may also be added at the start.

The action of the copper in the present process appears to be enhanced by the presence of alkaline material. For this reason the manufacture of oil modified resins by the process of Examples I and II, which involve the alcoholysis of the oil by treatment with glycerol in the presence of sodium hydroxide, is particularly advantageous in the practise of our invention. Alkaline metal salts are particularly effective as will be seen from the fact that the substitution of litharge as the alcoholysis catalyst for the sodium hydroxide of Examples I and II reduces materially the action of the copper. The maximum effect of the copper is produced when about one atom of alkali metal is present for each atom of copper. In some instances, alkali metal may be present in small amounts as an impurity in the glycerine, oil acids, or other resin ingredients, and for this reason may cause a more pronounced effect on the copper.

We prefer to add the copper as cupric acetate or cupric phthalate. The objects of the invention may be accomplished, however, by the use of any copper compounds in solution in the resin ingredients in the presence of oxygen. In fact, it is possible to use predetermined amounts of metallic copper which react with the resin ingredients to produce a solution of copper in such quantity as to give the results desired. The copper to be effective must of course be in solution during the synthesis of the resin, and this means necessarily that the copper is finally present in a state of organic combination. Copper as metal can only be dissolved by the resin, and therefore act as a catalyst, in the presence of oxygen. The inorganic compounds of copper are generally satisfactory. Those not recommended, particularly in commercial practice, are those not readily acted upon by phthalic acid, as for instance salts of strong or non-volatile acids, i. e., the chloride and sulfate. The copper may be used in any original form whatever so long as it ultimately dissolves in the resin. We desire it to be understood, therefore, that our invention consists in carrying out the resin reaction in the presence of copper compound in solution under controlled conditions rather than in the particular kind of copper containing material added to the reaction mixture.

The invention is from the standpoint of consistent duplication of results most advantageously practised through the direct addition during the resin synthesis of the organic copper compounds inasmuch as these are generally easily soluble in the resin ingredients contained in the reaction mixture. The use of metallic copper or of inorganic copper compounds, however, is not precluded. Thus, satisfactory results may be obtained by adding uniformly powdered copper or ground copper oxide to the resin ingredients in the batch. In this case the ratio of copper in solution in the form of organic compound to the resin ingredients is regulated to provide throughout the heat treatment of the resin ingredients the required amount of copper, which as stated above is usually calculated as metal.

It is also possible to obtain the improved results disclosed herein by carrying out the resin reaction in a copper kettle and adjusting the various factors of the reaction, including that of temperature previously referred to, the size of the batch, the copper surface exposed, its cleanliness, the amount of air permitted to reach the resin charge, etc., so that the copper from the container will by reacting with the resin charge provide the regulated quantity of copper mentioned above. This method, however, is far more difficult to control and less practical because of the greater difficulty in attaining the object of our invention, namely, the consistent duplication of results in the manufacture of resins of low acid number. The variations in quality, unaccountable or ascribed to innocent sources, of resins of the present type manufactured in copper kettles in accordance with the prior art practise and the lack of knowledge of the effect of copper, the amounts of it required, and the proper temperature of reaction have heretofore made the use of copper kettles a commercial liability rather than an advantage.

It will be seen from the foregoing that our invention resides in the discovery that copper has a positive effect upon polyhydric alcohol-polybasic acid resins synthesized in its presence and upon the discovery that resins dependably uniform as to non-gelling and low acid number are produced when the copper is present during the resin reaction under the conditions specified herein. The value of our invention will be apparent when these results are contrasted with the prior art spasmodic and irregular manifestations.

Various methods of reacting the resin ingredients, such as already known to the art, can be used in conjunction with the copper. In order not to darken the resins by its use, the elimination of air, or other devices known to the trade, may be employed. The copper need be present only during the latter part of the esterification reaction, i. e., between the time the phthalic anhydride has reacted without elimination of water to become singly linked to the alcoholic residues, and what would ordinarily be the time of final gelling.

The alcoholic constituent of the resin should be present with the phthalic anhydride inasmuch as the copper cannot be dissolved in the melted anhydride in the absence of the alcohol unless such undesirable adjuncts as closed vessels and steam are used. When making oil-modified resins by the alcoholysis or two stage reaction the copper should be added after the phthalic anhydride. If the copper is introduced when only oil and glycerine are in the kettle the copper may not be dissolved or may be thrown out with the result that the amount present later will be uncertain.

In most cases, the addition of a reasonable amount of copper will result in sufficient copper being still in solution at the end of the reaction for the acid number to be brought down to the desired point. Substances present in the melt do, however, exert a reducing effect on the copper and, in some special cases, it may be desirable to counteract this by the controlled admission of air during the reaction.

The resin ingredients include phthalic acid or anhydride, the polyhydric alcohols, and modifying ingredients, usually used in making resins of the present kind. The modifying agents may include fatty oil acids and other monobasic acids, resin acids, monohydric alcohols, etc. As shown by the examples, the oil modified resins, with which the present invention is particularly useful, are made from either the fatty oil or the fatty oil acids as the substances containing the fatty oil acid radicals which in conjunction with the phthalic anhydride esterify the polyhydric alcohol. Other useful polyhydric alcohols are glycol, sorbitol, pentacrythritol, diethylene glycol, trimethylene glycol, propylene glycol, diglycerol, higher polyglycols and polyglycerols. Resins made by the present process with polybasic acids other than phthalic acid, which in the appended claims means the anhydride as well as the acid itself, are not generally affected by the copper to the required degree, possibly because the copper salts of other polybasic acids are not sufficiently soluble in the melts. Thus, while some decarboxylation of maleic acid occurred with copper in the presence of potassium and a trace of action on crude sebacic acid, no apparent effect was found on the resins when they were made with fumaric, succinic, adipic and azelaic acid. If polybasic acids other than phthalic are used in the present process, the acid selected should be one whose copper salts are soluble in the resin reaction mixture. Those polybasic acids whose salts are not soluble in the resin melt should then not be present in too great amount as otherwise a resin having a low acid number will not be obtained.

A large variety of copper compounds other than those mentioned will suggest themselves to those skilled in the art. Examples of these, which are conveniently cupric rather than cuprous, are formate, acetate, phthalate, butyrate, laurate, palmitate, stearate, oleate, linoleate, tungate, oxide, hydroxide, carbonate, succinate, fumarate, maleate, citrate, malate, tartrate, adipate, sebacate, azelate, caproate, benzoate, myristate, naphthylate, naphthalate, and glycerate.

The uses of this invention will commend themselves to all those familiar with the requirements placed on synthetic paint and enamel vehicles. Basic pigments derived from zinc are known to have very desirable effects on the durability of enamel films providing such pigments can be used without excessive bodying of the enamel and hardening of the applied film. The use of drying oils, especially China-wood oil, to modify polyhydric alcohol-polybasic acid resins, results commonly in an inability to obtain vehicles usable with zinc pigments. By the use of copper, such resins may frequently be used successfully in this manner. The drying properties of resins may be adversely affected by an undue use of a copper catalyst and hence a judicious application of this invention, according to the skill of the varnish maker, is indicated for the special commercial applications in view.

Resins made according to the invention are particularly suitable for use in modifying pyroxylin lacquer compositions. Any reduction in hardness or drying time may often be counteracted by the use of a slightly greater amount of pyroxylin. Resins made by the present process have unusually good compatibility with pyroxylin.

The low acid number of the subject resins is an advantage in reducing loss of adhesion and corrosion when they are applied over metallic objects and tends to counteract any loss in water resistance due to greater softness. Commercial resins of acid numbers ordinarily between practically 0 and 65 may be made by the present process. In all instances, the resins made by our process have a final acid number of at least 50% less than if they were made without the presence of copper as described herein. Another important advantage is the reduction in the time required to make the resins. This is particularly true where the resin is prepared in small units. In the present process the time is often reduced fully one half as compared to the usual practise of making the resins.

As many apparently widely different embodiments of this invention may be made without departing from the spirit and scope thereof, it is to be understood that we do not limit ourselves to the specific embodiments thereof except as defined in the appended claims.

We claim:

1. A process for making resins of low acid number which comprises heating to resinification a reaction mixture of phthalic anhydride and glycerol in the presence of a copper compound in solution in the reaction mixture, said compound containing not less than 0.002% copper based upon the weight of the reacting ingredients, and thereby producing a resin having an acid number at least 50% less than a resin similarly made in the absence of said copper compound.

2. A process for making resins of low acid number which comprises heating to resinification at a temperature not less than 425° F. a reaction mixture of phthalic anhydride and glycerol in the presence of a small amount of an alkaline compound and in the presence of a copper compound in solution in the reaction mixture, said compound containing not less than 0.002% copper based upon the weight of the reacting ingredients, and thereby producing a resin having an acid number at least 50% less than a resin similarly made in the absence of said copper compound.

3. A process for making resins of low acid number which comprises adding to a reaction mixture of phthalic anhydride and glycerol an organic compound of copper soluble in said reaction mixture, said compound containing not less than 0.002% copper based upon the weight of the reacting ingredients, and thereby producing a resin having an acid number at least 50% less than a resin similarly made in the absence of said copper compound.

4. A process for making resins of low acid number which comprises heating to resinification phthalic anhydride, glycerol, and a substance of the group consisting of fatty oils and fatty oil acids in the presence of a copper compound in solution in the reaction mixture, said compound containing not less than 0.002% copper based upon the weight of the reacting ingredients, and thereby producing a resin containing not more than 50% combined fatty oil having an acid number at least 50% less than a resin similarly made in the absence of said copper compound.

5. The process set forth in claim 1 in which the heating is at a temperature above 425° F., and the amount of copper is from 0.01% to 0.3%.

6. The process set forth in claim 3 in which the heating is at a temperature above 425° F., and the amount of copper is from 0.01% to 0.3%.

7. The process set forth in claim 4 in which the heating is at a temperature above 425° F., and the amount of copper is from 0.01% to 0.3%.

8. An oil modified synthetic resin of low acid number comprising in chemical combination substantially chemically equivalent amounts of resin forming ingredients consisting substantially solely of glycerol, phthalic anhydride, and the oil acids contained in fatty oil and obtainable by heating to resinification a reaction mixture of said ingredients having dissolved therein a copper compound containing not less than 0.002% copper based upon the weight of the reacting ingredients, said resin containing not more than about 50% combined oil and having an acid number at least 50% less than a resin made solely from said ingredients in the absence of said copper compound.

9. A coating composition comprising a basic pigment and the resin set forth in claim 8.

10. A coating composition comprising zinc oxide and the resin set forth in claim 8.

11. A process for making resins of low acid number which comprises adding to a reaction mixture of phthalic anhydride and polyhydric alcohol an organic copper salt, and heating the reaction mixture to resinification, said copper salt being soluble in the reaction mixture and being present in amount calculated as metal not less than about 0.002% based upon the total weight of the resin ingredients.

HERBERT O. ALBRECHT.
RONALD A. McGLONE.
STEPHEN JOHN ROSKOSKY.